S. E. BURKE.
BUTTON REMOVER.
APPLICATION FILED APR. 27, 1910.
974,118.
Patented Nov. 1, 1910.
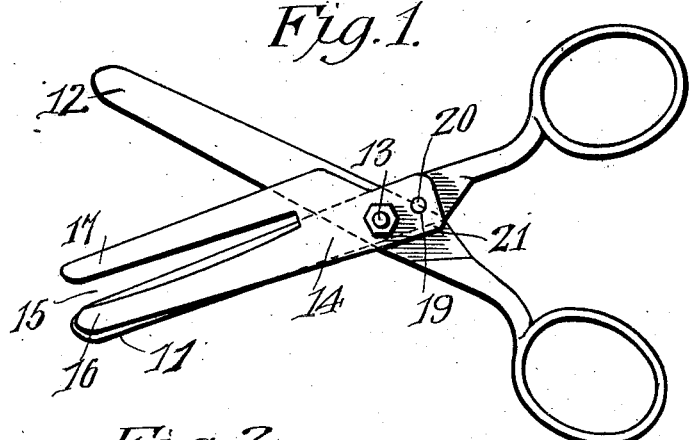
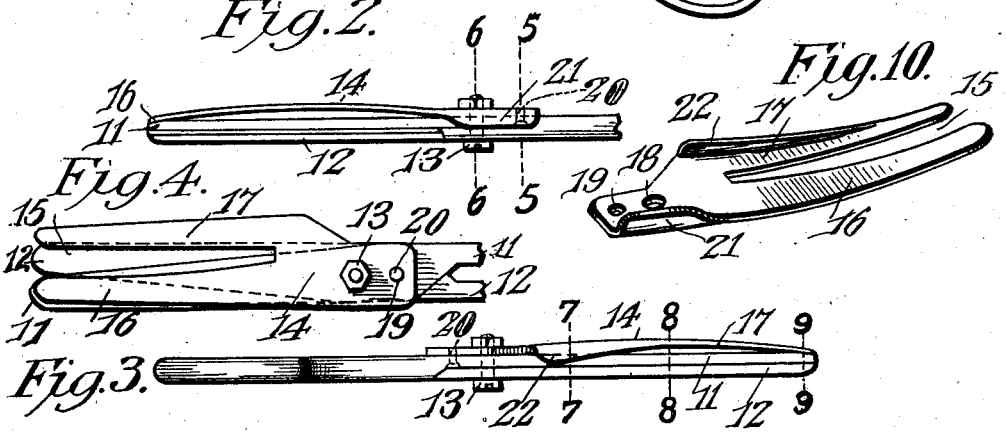
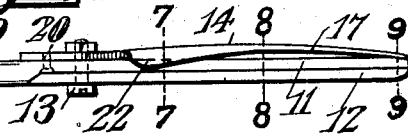
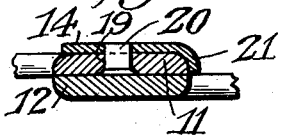
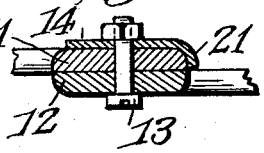
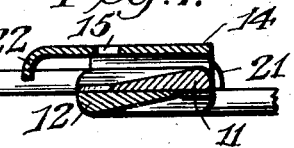
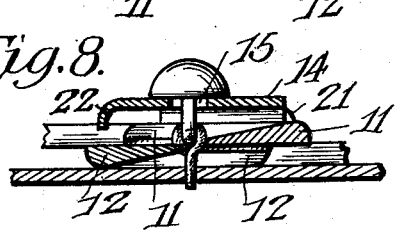
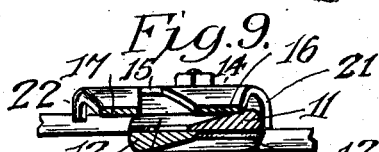

UNITED STATES PATENT OFFICE.

STEPHEN E. BURKE, OF HAMILTON, INDIANA.

BUTTON-REMOVER.

974,118.     Specification of Letters Patent.     Patented Nov. 1, 1910.

Application filed April 27, 1910. Serial No. 558,063.

*To all whom it may concern:*

Be it known that I, STEPHEN E. BURKE, a citizen of the United States, residing at Hamilton, in the county of Steuben and State of Indiana, have invented a new and useful Button-Remover, of which the following is a specification.

This invention relates to button removers, and has for its purpose to provide an attachment for shears which will facilitate the severing of the threads by which buttons are attached to shoes, etc.

The object of the present invention is to provide a simple and efficient device which may be attached to a pair of shears of the well known construction and may be operated easily and with great rapidity.

A further object is to provide a device for raising the buttons or drawing the same away from the material, preparatory to severing the threads, at the same time protecting the cutter from injury and also avoiding injury to the material by which the button is carried.

Another object is to detachably connect the guide plate to the shears so that it may be readily removed, and thus allow the shears to be sharpened, or to permit the operator to use the shears in the ordinary manner.

Other objects and advantages will be pointed out in the ensuing description.

The invention consists in a button-remover embodying certain novel features and details of construction and arrangement of parts, as hereinafter fully described, illustrated in the several views of the drawing, and incorporated in the appended claims.

In the accompanying drawings, Figure 1 is a side view of a pair of shears in open position, showing my attachment applied thereto. Fig. 2 is an edge view with the shears in closed position. Fig. 3 is a view showing the opposite edge. Fig. 4 is a top plan view with the shears closed. Fig. 5 is a section on the line 5—5, Fig. 2. Fig. 6 is a section taken on the line 6—6, Fig. 2. Fig. 7 is a section on the line 7—7, Fig. 3, showing the relation of the slotted plate to the cutting blades when in a closed position. Fig. 8 is a view on the line 8—8, Fig. 3, but with the blades in the act of severing a button from a shoe. Fig. 9 is a section on the line 9—9, Fig. 3. Fig. 10 is an inverted perspective view of my improved guard plate detached from the shears.

Similar characters of reference denote corresponding parts in the several views.

Referring to the drawings, 11 and 12 designate, respectively, the blades of a pair of shears, which are of the ordinary construction, and are pivoted together by the usual transverse bolt 13.

14 designates a guard plate, which is arranged longitudinally of and is detachably connected to the outer face of the blade 11, which blade is farthest removed from the material during the button-severing operation. Said plate is substantially oblong in shape and is of a length corresponding to that of the blades of the shears and is provided with a longitudinal slot 15, opening out at the front or outer end of the plate and being flared at such point to facilitate the entrance of the eyes or shanks of the buttons. The said slot extends about two-thirds of the length of the plate, thus defining tines or branches 16 and 17. It will be noted that the slot is smaller at its inner end than at its outer or front end so that the shank of the button may be inserted a sufficient distance in the slot until it is wedged between the walls and when the button severing operation has been completed the button is retained in this slot rather than fall on the floor.

The guard plate is attached to the shear blade 11 by means of the pin or bolt 13, which extends through an opening 18 in the guard plate, and the latter is also provided at its extreme rear or inner end with an opening 19, which is adapted to be engaged by an outstanding pin or lug 20, carried by the shear member 11. By this arrangement the plate is held from pivotal movement on the bolt or pin of the shears. The plate is further held from independent movement by means of the side flange 21 which is integral with the plate and is located adjacent the openings 18 and 19, and is adapted to engage over the edge of the shear blade 11.

The tines or branches of the guard plate are bowed longitudinally of themselves, as shown in Figs. 2 and 3, so as to separate the button from the material during the severing operation, and to space the shank of the button from the blades during the same operation, thus preventing the blades from becoming dulled by contacting with the metallic shank of the button. The extreme front end of the attached tine 16 rests on the front end of the shear blade 11, and the front end of tine 17 is spaced from shear blade 12, as shown in Fig. 9, so that the shears may be operated without interference from the guard plate. The guiding inner edge of tine 16 is positioned slightly in rear of the cutting edge of the shear blade 11, as shown in Figs. 4, 7, 8 and 9, and by reason of this construction, the button will not be twisted, but will lie evenly on both tines during the severing operation. The tine 17 is provided on its outer edge with an inwardly-extending flange 22, extending longitudinally thereof and diminishing in width toward the front.

In operation, the shears in open position (see Fig. 1) are advanced along the line of buttons which enter the slot 15, causing the buttons to ride upon the bowed guard plate and to be elevated thereby. The buttons pass up the bowed tines until the securing threads are taut and the button shank is spaced from the cutting members, when the shears are operated to sever the button from the shoe.

It will be understood that changes in the form, proportion, and minor details of construction, may be resorted to without departing from the spirit or sacrificing any of the advantages of this invention.

Having thus described the invention, what I claim as new, and desire to secure by Letters Patent, is:—

1. In a button remover, the combination with pivoted cutting blades, a plate detachably secured to the outer face of one of said blades and extending longitudinally thereof, said plate being mounted on the pivot of the blades and slotted longitudinally, said slot being open at the outer end of the plate and serving to guide the button when the cutting blades are brought into cutting relation.

2. In a button remover, the combination with pivoted shear blades, of a slotted plate detachably secured to the outer face of one of the blades, the securing means comprising openings in the inner end of said plate, one of said openings being adapted to coöperate with a pin carried by said shear blade, the other opening receiving the fulcrum pin of the shear blades, and a flange on said plate adjacent said openings, said flange contacting with the outer edge of said shear blade.

3. In a button remover, the combination of a pair of pivoted shear members, of a guide plate detachably secured to the outer face of one of said blades and extending longitudinally thereof, said plate being slotted longitudinally and forming tines on each side, the rear end of the plate and the front end of one tine resting on the same shear member leaving the other member free.

4. In a button remover, the combination of a pair of pivoted cutting blades, a plate detachably secured at its rear or inner end to one of the blades and extending longitudinally thereof, said plate being mounted on the pivot of the blades and slotted longitudinally thereof and defining tines on each side, the outer end of one tine and the inner end of the plate resting on the same blade leaving the other blade free.

5. In a button remover, the combination of a pair of pivoted cutting blades, of a guide plate detachably secured at its rear or inner end to the outer face of one of said blades and extending longitudinally thereof, said plate being fixed with relation to one of said blades and slotted longitudinally, said slot defining tines on each side thereof, said tines being bowed longitudinally and serving to elevate the button from the cutting blades during the cutting operation, the rear or inner end of the plate and the outer end of one tine resting on the same blade leaving the other blade free.

6. In a button remover, the combination with pivoted shear blades having operating handles, a plate secured to the outer side face of one of said blades and to the face remote from the free blade, said plate having a slot extending longitudinally thereof in substantial alinement with the cutting edge of said blade, and defining tines on each side of said slot, the latter being open at its front end and decreasing in width toward the inner or closed end, said tines being bowed longitudinally, and said tines and shear blades serving to elevate the button from the material during the cutting operation.

In testimony, that I claim the foregoing as my own, I have hereto affixed my signature in the presence of two witnesses.

STEPHEN E. BURKE.

Witnesses:
FRANK REPLES,
GRANT S. CHILCATE.